Patented Nov. 7, 1922.

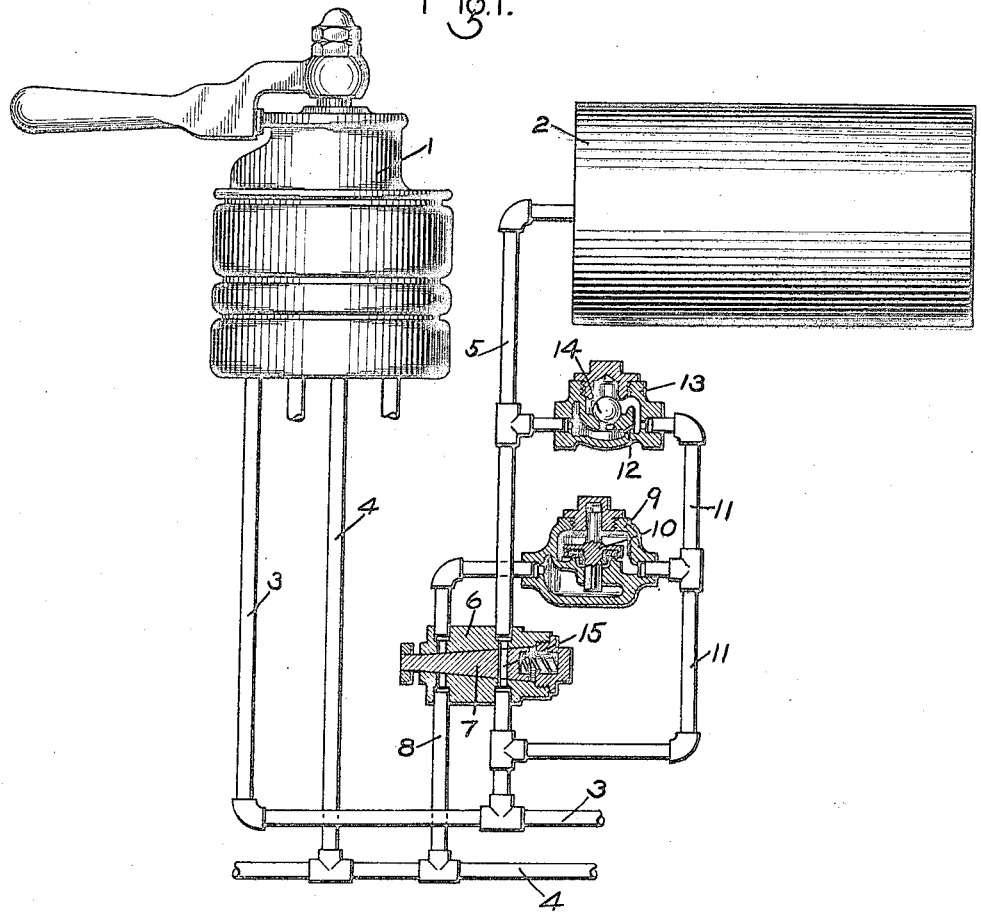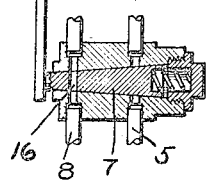

1,434,385

UNITED STATES PATENT OFFICE.

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed March 21, 1921. Serial No. 453,878.

*To all whom it may concern:*

Be it known that I, ELLIS E. HEWITT, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a locomotive brake equipment.

The principal object of my invention is to provide improved means for facilitating the running of a locomotive as a dead engine in a train, with respect to the brakes.

In the accompanying drawing; Fig. 1 is a diagrammatic view of a portion of a locomotive brake equipment, with my improvement embodied therein, and Fig. 2 a sectional view of the dead engine cock in the position for operating the locomotive as a dead engine.

The apparatus shown in Fig. 1 comprises a brake valve device 1 of the usual construction, a main reservoir 2, a main reservoir supply pipe 3, and a brake pipe 4, connected to the brake valve 1.

A branch pipe 5 connects the main reservoir 2 with the main reservoir supply pipe 3 and interposed in the branch pipe 5 is a dead engine cock 6 having a tapered plug valve 7.

The valve 7 also controls communication from the brake pipe 4 through a pipe 8 to a check valve device 9 containing a gravity check valve 10. From the check valve 10, fluid may flow through pipe 11 to the main reservoir supply pipe 3 and also through a restricted port 12 in a check valve device 13 to branch pipe 5 and the main reservoir 2, the check valve device 13 containing a ball check valve 14 for permitting full flow from the main reservoir 2 to the main reservoir supply pipe 3.

When the locomotive is run as a live engine, the valve 7 of the dead engine cock 6 is turned to the position shown in Fig. 1, in which a port 15 establishes communication through the pipe 5, while communication through pipe 8 is cut off.

In this position, the main reservoir 2 being charged in the usual manner, fluid under pressure is supplied to the main reservoir pipe 3 and the brake valve device 1 as in the standard equipment.

If the locomotive is operated as a dead engine, the valve 7 is turned to the position shown in Fig. 2, in which communication through the branch pipe 5 is cut off, while communication is established through a port 16 from the brake pipe 4 through pipe 8.

The main reservoir will then be charged from the brake pipe past the check valve 10 to pipe 11 and through the restricted port 12.

Fluid flowing past the check valve 10 also flows unrestricted through the pipe 11 to the main reservoir supply pipe 3, so that fluid under pressure will be promptly available for the brake controlling apparatus on the locomotive, such as the well known E T distributing valve device and also, in case of a double end equipment, for maintaining the pressure in the rotary valve chamber of the brake valve device at the opposite end of the car, so as to prevent brake pipe pressure from lifting the rotary valve of the brake valve from its seat.

At the same time, since the main reservoir 2 can only be charged from the brake pipe through the restricted port 12, the brake pipe pressure will not be reduced by flow to the main reservoir in charging same at a sufficient rate to cause a possible undesired application of the brakes.

Having now described my invention, what I claim as new and desire to secure by Letters Patent, is:—

1. The combination with a main reservoir, brake pipe, and main reservoir supply pipe, of means for supplying fluid from the brake pipe through a restricted port to the main reservoir and through a large opening to the main reservoir supply pipe and a check valve for permitting free flow of fluid from the main reservoir to the main reservoir supply pipe.

2. The combination with a main reservoir, brake pipe, main reservoir supply pipe, of means for supplying fluid from the brake pipe through a restricted port to the main reservoir and through a large opening to the main reservoir supply pipe, a check valve for permitting free flow of fluid from the main reservoir to the main reservoir supply pipe and a check valve preventing back flow from the main reservoir to the brake pipe.

3. In a locomotive brake equipment, the combination with a main reservoir, brake pipe, and main reservoir supply pipe, of means for supplying fluid from the brake pipe through a restricted port to the main reservoir and through a large opening to the main reservoir supply pipe and a manually operated cock having a position for establishing communication from the brake pipe to the main reservoir and another position for cutting off said communication and for connecting the main reservoir directly to the main reservoir supply pipe.

In testimony whereof I have hereunto set my hand.

ELLIS E. HEWITT.